US012596830B1

(12) United States Patent
M et al.

(10) Patent No.: US 12,596,830 B1
(45) Date of Patent: Apr. 7, 2026

(54) DATA GOVERNANCE UTILIZING PATTERN BASED SIGNET CONTROL

(71) Applicant: Kyndryl, Inc., New York, NY (US)

(72) Inventors: Nalini M, Chennai (IN); Kalpesh Sharma, Bangalore (IN); Veeresh Bushetti, Savanur (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/964,870

(22) Filed: Dec. 2, 2024

(51) Int. Cl.
*G06F 21/62* (2013.01)
*G06F 16/335* (2019.01)

(52) U.S. Cl.
CPC ........ *G06F 21/6218* (2013.01); *G06F 16/335* (2019.01)

(58) Field of Classification Search
CPC ............................ G06F 21/6218; G06F 16/335
See application file for complete search history.

(56) References Cited

U.S. PATENT DOCUMENTS

| | | | |
|---|---|---|---|
| 9,923,927 B1 | 3/2018 | Mcclintock et al. | |
| 10,810,532 B2 | 10/2020 | Avrahami et al. | |
| 11,321,338 B2 | 5/2022 | Okorafor et al. | |
| 11,586,729 B2 | 2/2023 | Jin et al. | |
| 11,868,167 B2 | 1/2024 | Wheatley et al. | |
| 11,956,245 B1 | 4/2024 | Bhatt et al. | |
| 2004/0064695 A1* | 4/2004 | Lotspiech ............. | H04L 9/3249 |
| | | | 713/168 |

| | | | |
|---|---|---|---|
| 2006/0178913 A1* | 8/2006 | Lara ....................... | G16H 40/20 |
| | | | 707/999.102 |
| 2020/0250139 A1 | 8/2020 | Muffat et al. | |
| 2021/0390196 A1* | 12/2021 | Lavine ................. | H04L 63/102 |
| 2023/0328075 A1 | 10/2023 | Almasan et al. | |
| 2023/0409742 A1* | 12/2023 | Hasni ................. | G06F 3/04883 |
| 2024/0193299 A1* | 6/2024 | Voisin ................... | G16H 10/60 |

OTHER PUBLICATIONS

Anonymous, "Amazon Macie Features", URL: https://aws.amazon.com/macie/features/, Retrieved: Sep. 17, 2024, 7 pages.
Sharma et al., "The biggest data breach fines, penalties, and settlements so far", URL: https://www.csoonline.com/article/567531/the-biggest-data-breach-fines-penalties-and-settlements-so-far.html, Retrieved: Sep. 17, 2024, 9 pages.

* cited by examiner

*Primary Examiner* — Tarek Chbouki
(74) *Attorney, Agent, or Firm* — CANTOR COLBURN LLP; Erik Swanson

(57) ABSTRACT

A data governance system includes a signet template generator engine, a signet specification enforcement, and a pattern based signet controller. The signet template generator engine generates a signet template by applying at least one signet to raw data received from a data producer. The at least one signet is designated with a consent level and includes at least one data field designated with a consent identifier. The signet specification enforcement engine analyzes the consent level of the at least one signet and the consent identifier of the at least one data field, and outputs first filtered data based on the consent identifier of the at least one data field. The pattern based signet controller generates second filtered data based on the consent level of the at least one signet, and outputs a combination of the first filter data and the second filtered data as final data.

13 Claims, 11 Drawing Sheets

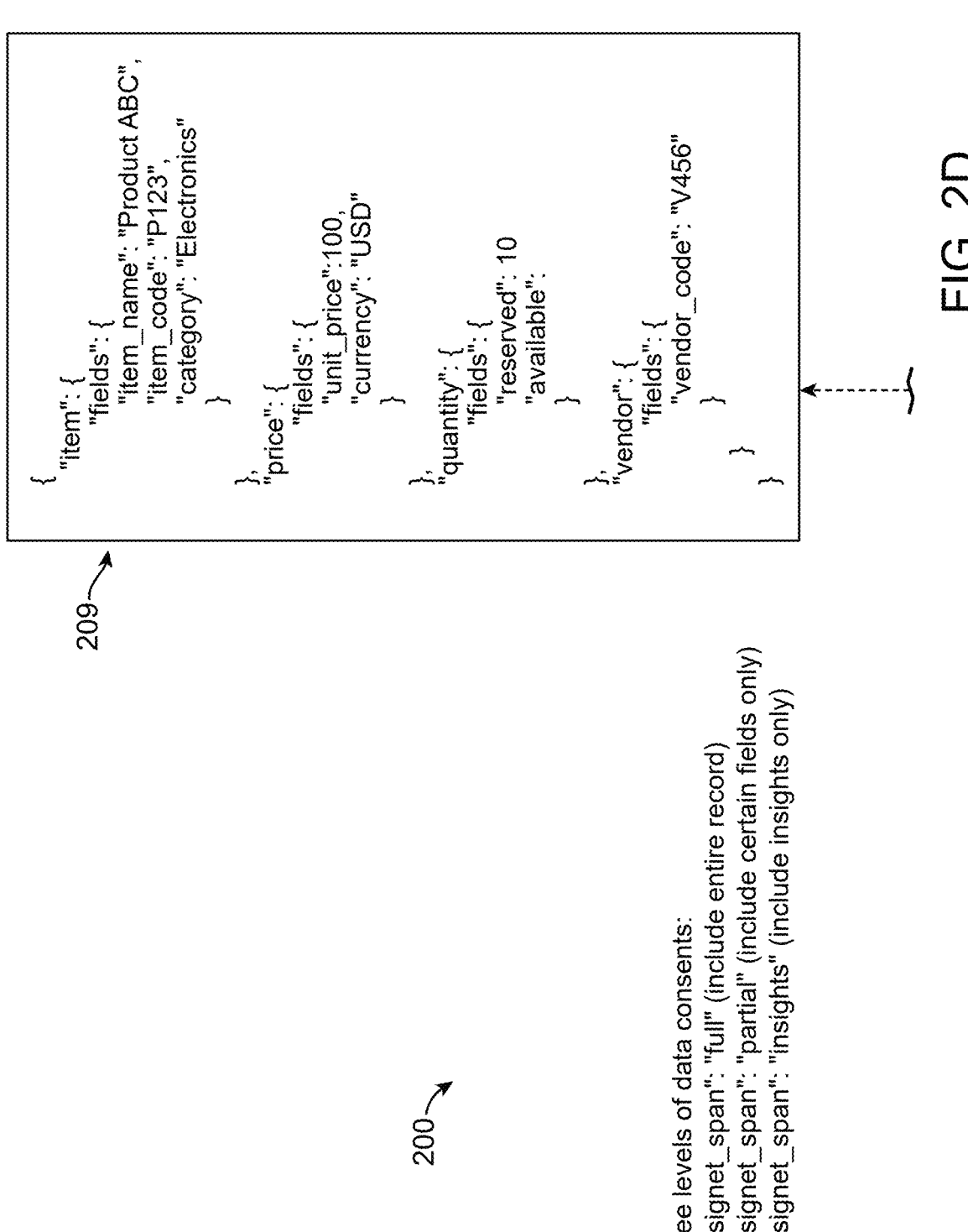

```
{
  "item": {
    "fields": {
      "item_name": "Product ABC",
      "item_code": "P123",
      "category": "Electronics"
    }
  },
  "price": {
    "fields": {
      "unit_price":100,
      "currency": "USD"
    }
  },
  "quantity": {
    "fields": {
      "reserved": 10
      "available":
    }
  },
  "vendor": {
    "fields": {
      "vendor_code": "V456"
    }
  }
}
```

Three levels of data consents:
1) "signet_span": "full" (include entire record)
2) "signet_span": "partial" (include certain fields only)
3) "signet_span": "insights" (include insights only)

DATA GOVERNANCE UTILIZING PATTERN BASED SIGNET CONTROL

BACKGROUND

The present invention generally relates to computer systems, and more specifically, to data governance utilizing pattern based signet control to achieve transparent data lifecycles.

As organizations continue to generate and collect vast amounts of data for decision-making, compliance, and operational efficiency, the complexity of managing that data effectively has escalated. Data governance frameworks face significant challenges in ensuring that the lifecycle of the data from its creation to its disposal is properly supervised.

Modern data governance requires not only the management of data access and storage but also the establishment of clear accountability for how data is used, processed, and shared within the organization. However, the sheer volume and variety of data that is often spread across multiple platforms and systems makes it difficult for businesses and organizations to ensure data consistency and accuracy.

SUMMARY

A non-limiting embodiment of the present disclosure provides a data governance system, which includes a data signator module, a signet specification enforcement (SPE) engine and a pattern based signet controller (PBSC). The data signator module applies signets to raw data received from a data producer and stores historical data indicative of the applied signet. The SPE engine analyzes consent levels associated with the signets and consent identifiers associated with data fields included in each of the signets, and outputs first filtered data based on the consent identifiers. The PBSC generates second filtered data based on the consent levels of the signets outputs the second filtered data as final data for external access.

According to another non-limiting embodiment, a computer-implemented method includes receiving raw data from a data producer, and generating, by a signet template generator (STG) engine, a signet template by applying at least one signet to the raw data. The at least one signet is designated with a consent level and including at least one data field designated with a consent identifier. The method further includes analyzing, by a signet specification enforcement (SPE) engine, the consent level of the at least one signet and the consent identifier of the at least one data field, and outputting, by the SPE engine, first filtered data based on the consent identifier of the at least one data field. The method further includes generating, by a pattern based signet controller (PBSC), second filtered data based on the consent level of the at least one signet, and outputting, by the PBSC, a combination of the first filtered data and the second filtered data as final data to an external remote server for external access.

According to yet another non-limiting embodiment, a computer program product is provided to control a computing system to perform data governance. The computer program product includes a computer readable storage medium having program instructions embodied therewith. The program instructions are executable by an electronic computer processor to control the computing system to perform operations comprising receiving raw data from a data producer, and generating, by a signet template generator (STG) engine, a signet template by applying at least one signet to the raw data. The at least one signet is designated with a consent level and including at least one data field designated with a consent identifier. The operations further include analyzing, by a signet specification enforcement (SPE) engine, the consent level of the at least one signet and the consent identifier of the at least one data field, and outputting, by the SPE engine, first filtered data based on the consent identifier of the at least one data field. The operations further include generating, by a pattern based signet controller (PBSC), second filtered data based on the consent level of the at least one signet, and outputting, by the PBSC, a combination of the first filtered data and the second filtered data as final data to an external remote server for external access.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 2B, 2C and 2D depict a data governance system according to one or more embodiments of the present disclosure;

DETAILED DESCRIPTION

Figure 1:
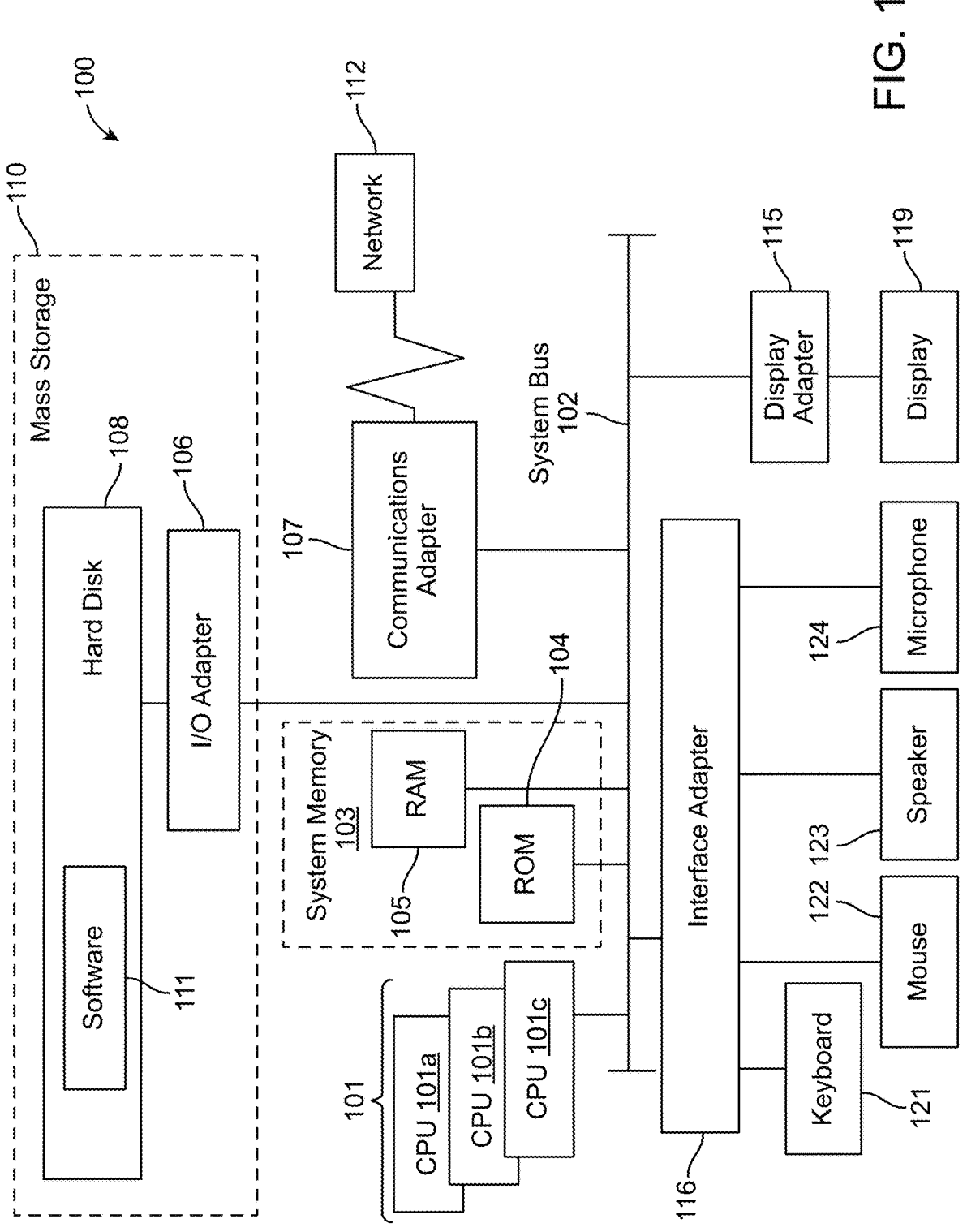
FIG. 1 depicts a block diagram of an example computer system for use in conjunction with one or more embodiments of the present disclosure.

Approaches to managing the complexity of vast datasets for effective data governance focus on leveraging advanced technologies and maintaining robust standards. Organizations use applications that process extensive datasets to improve decision-making and enhance user experiences. Machine learning algorithms are integrated to identify patterns and extract valuable insights to enable more intelligent data use. Regularly updating and refining data models ensures that the information remains accurate, relevant, and reflective of changing patterns. Additionally, implementing strict governance rules and adhering to ethical standards is essential for safeguarding sensitive data, ensuring privacy, and maintaining user trust and security in increasingly data-driven environments.

Despite the advancements in data governance, existing solutions face several limitations. The sheer volume of data can overwhelm current data governance systems and cause processing bottlenecks and reduced efficiency. Identifying meaningful patterns within large datasets is also challenging because it requires complex algorithms and significant computing resources. Balancing data utilization with privacy considerations also remains a complex task because it demands careful governance and transparency to ensure compliance without compromising data access. The use of current machine learning techniques has also proven to be impractical because the learned models require substantial resources, including computing power, skilled personnel, and continuous support. In terms of General Data Protection Regulation (GDPR) compliance, for example, many machine learning techniques operate according to overly simplistic models that either block all data or allow unrestricted access, which leads to inefficient data governance.

Non-limiting embodiments of the present disclosure address the shortcomings described above by providing a system and method that achieves transparent data lifecycle governance and supervision through pattern based signet control (PBSC) for data governance. As described herein, PBSC is a dynamic technical scheme for managing data governance by using user consent designations to control and supervise data access and usage throughout its lifecycle.

Various non-limiting embodiments of the present disclosure provide a data governance system capable of governing data by utilizing pattern based signet control to achieve transparent data lifecycles. In a non-limiting embodiment, the data governance system allows a data producer (e.g., a patient entering a medical office or hospital) to comprehend the data processing performed by a data governance entity (e.g., the medical office or hospital data management system) through various phases of a model. For example, the data governance system according to a non-limiting embodiment allows a data producer (e.g., patient) to understand the raw data used to perform data analysis and assign appropriate signets for data governance by the entity (e.g., hospital). A signet refers to a structured data unit containing specific fields, each tagged with consent indicators (e.g., consent or non-consent) and assigned a data consent level (e.g., full, partial, or insight) to control data access and disclosure according to governance policies.

In another non-limiting embodiment, the data governance system can identify sensitive or confidential data processing and prompt a user for consent. For example, the data governance system can initiate signet anomaly detection and perform a consent flow when a user has not consented to certain data processing activities. In yet another non-limiting embodiment, the data governance system can provide consent over the data lifecycle by assisting a data producer to couple or decouple their associated data from further processing at the producer's consent requests. In still another non-limiting embodiment, the data governance system implements a rubric or scheme that determines how a particular signet data governance process is applied based on the consumption trend of associated insights. As described herein, "insights" refer to patterns, trends, or relationships in data that are identifiable by the data governance system. In some instances, the insights convey a pattern in data or a relationship between variables that were not previously known to exist. In this manner, the data governance system can utilize the insights to provide decision-making suggestions, which facilitate the achievement of targeted organization goals and metrics. Accordingly, various non-limiting embodiments of the data governance system and methods described herein can establish a controlled environment for internal analysis of data and establish patterns for the purpose of performing transparent data governance over the lifecycle the data.

As will be described herein, various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, a computer system 100 is generally shown in accordance with one or more embodiments of the invention. The computer system 100 can be an electronic computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, a desktop computer, a laptop computer, a tablet computer, or a smartphone. In some examples, the computer system 100 may be a cloud computing node. The computer system 100 may be described in the general context of computer system executable instructions, such as program modules, being executed by a computer system. Generally, program modules may include routines, programs, objects, components, logic, data structures, and so on that perform tasks or implement abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, a multi-core processor, a computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

The software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
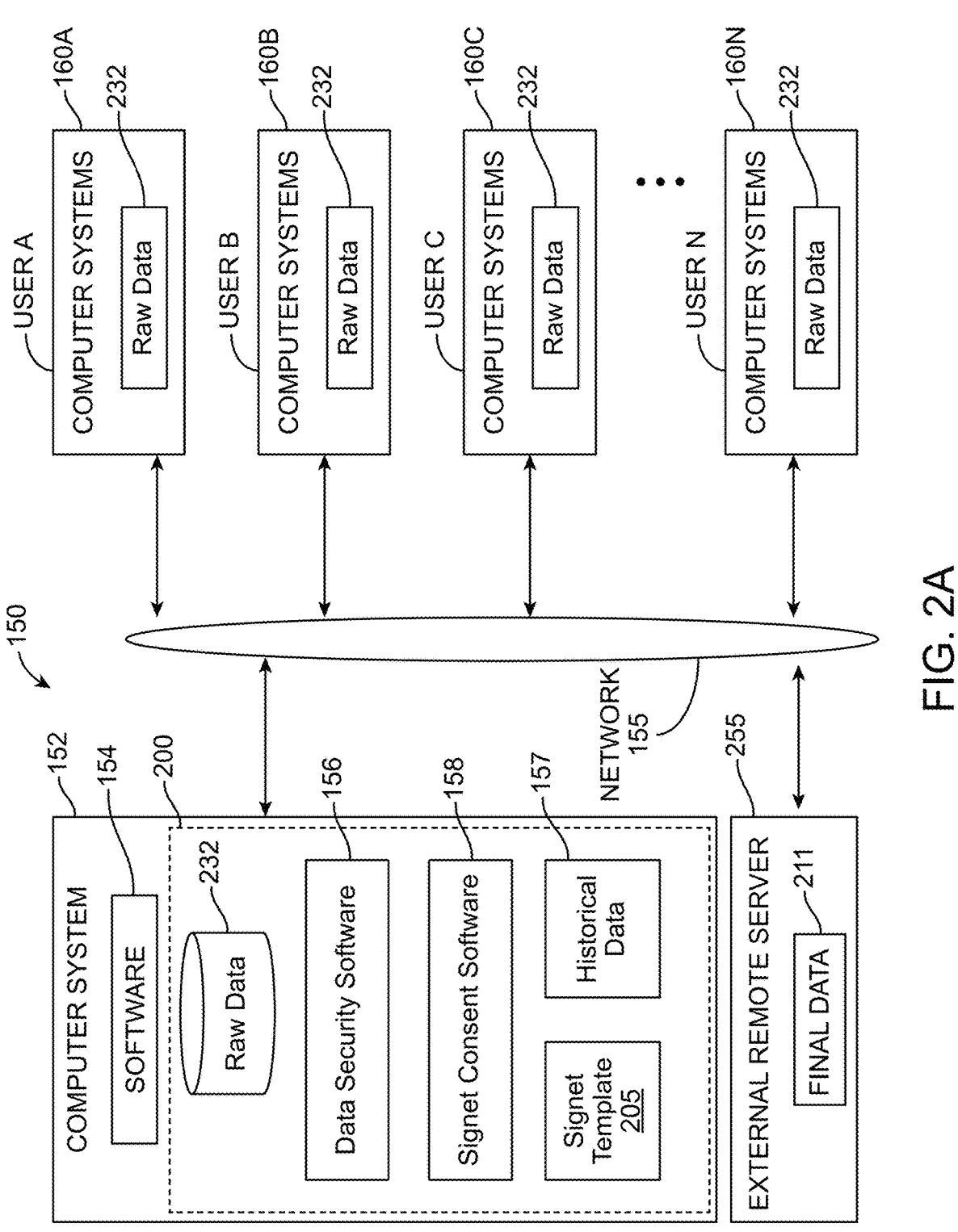
FIG. 2A depicts a block diagram of an example system configured to perform data governance utilizing pattern based signet control to achieve transparent data lifecycles according to one or more embodiments of the present disclosure.

FIG. 2A depicts a block diagram of an example computing system 150 capable of operating a data governance system 200 configured to perform data governance utilizing pattern based signet control to achieve transparent data lifecycles according to one or more embodiments. The data governance system 200 ensures both transparency and security in data management, while reducing the need for manual interventions in the governance process.

The data governance system 200 can be implemented by a computer system 152 configured to communicate over a network 155 with many different computer systems, such as a computer system 160A, a computer system 160B, a computer system 160C, through a computer system 160N (collectively referred to as computer systems 160A-160N). The computer system 152 is also configured to communicate with an external remote server 255.

The network 155 can be a wired and/or wireless communication network, and the communication network includes a telecommunications network, the public switched telephone network (PTSN), voice over IP (VOIP) network, etc. The communication network includes cellular networks, satellite networks, etc.

The computer systems 160A-160N may represent end user devices of user A, user B, user C, through user N. As represented by computer systems 160A-160N, the user devices can be a personal computer or laptop. The user devices can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The computer systems 160A-160N can include various software and hardware components including software applications (apps) for communicating over the network 155 as understood by one of ordinary skill in the art. The software applications provide users with a way to access information, services, entertainment, etc. The computer systems 160A-160N can include various software and hardware components designated to perform specific functions as discussed herein.

The computing system 150 implements software 154 that includes, can be integrated with, and/or can call other pieces of software, algorithms, application programming interfaces (APIs), graphical user interfaces (GUIs) etc., to operate as discussed herein. The software 154 can include and/or access logic to generate one or more signet templates 205 using raw data 232 provided by a data producer. The software 154 can also include and/or access logic to perform data governance utilizing pattern based signet control based on data included in a signet template 205.

In one or more embodiments, the data governance system 200 utilizes additional software such as data security software 156 and signet consent software 158. The data security software 156 can include and/or access logic that utilizes historical data 157 to determine the existence of an anomaly in the signet template 205. The signet consent software 158 can include and/or access logic that filters or restricts data included in the signet template from being included in final data shared externally (e.g., output to a public accessible server) based on consent levels associated with the signet template 205 and/or consent identifiers associated with the data included in the signet template 205.

The computer system 152, computer systems 160A-160N (e.g., user devices), software 154, data security software 156, external remote server 255, and the signet consent software 158 can include functionality and features of the computer system 100 in FIG. 1 including various hardware components and various software applications such as software 111 which can be executed as instructions on one or more processors 101 in order to perform actions according to one or more embodiments of the invention.

The computer system 152 may be representative of numerous computer systems and/or distributed computer systems configured to provide a raw data interrace to users (e.g., data producers) of the computer systems 160A-160N. One or more of the computer systems 160A-160N are utilized by users to submit the raw data 232 used to generate one or more signet templates 205 and to designate the consent levels and/or the consent identifiers. The computer system 152 can be part of a cloud computing environment such as a cloud computing environment 50 depicted in FIG. 6, as discussed further herein.

Figure 2B:
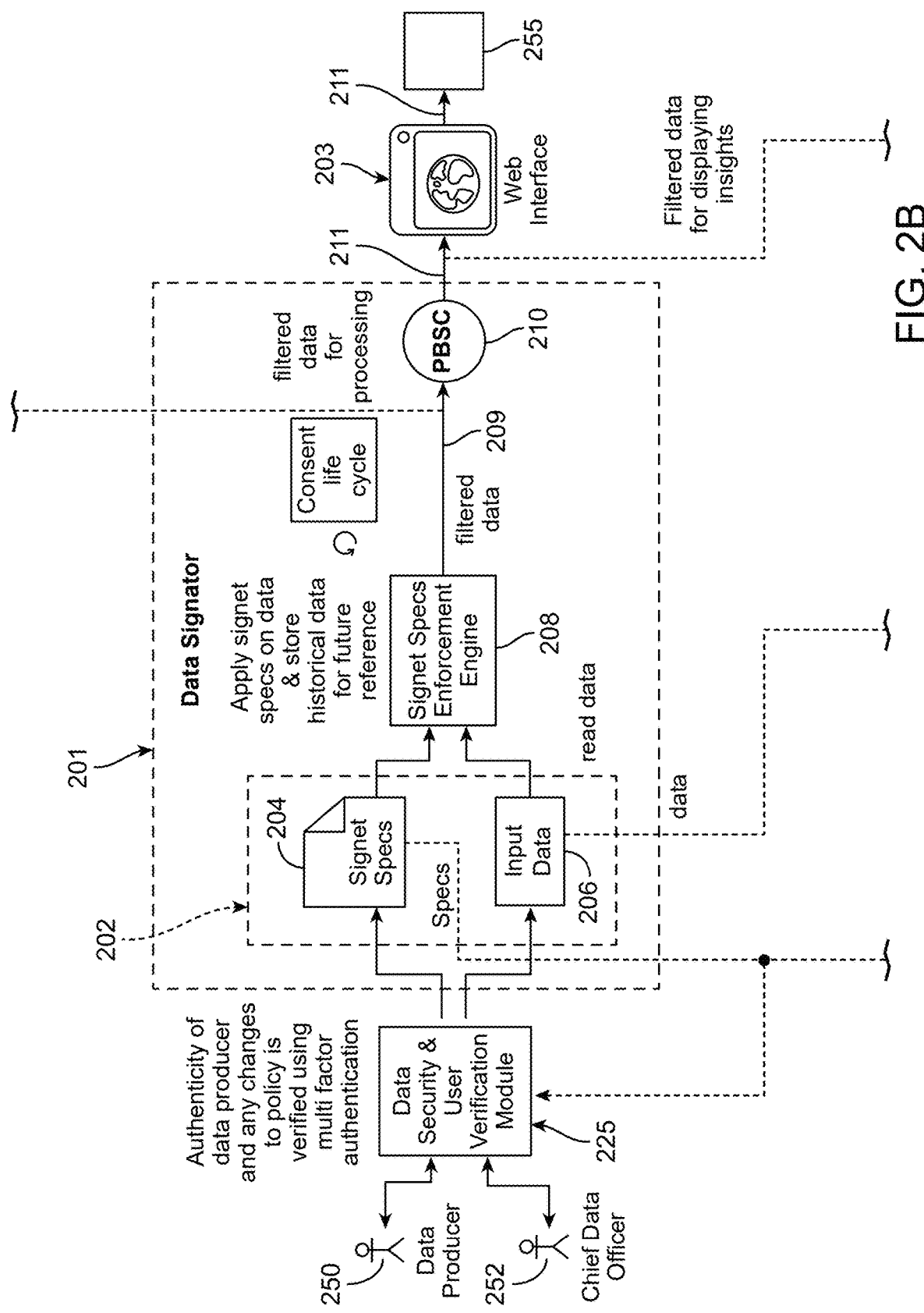
Figure 2C:
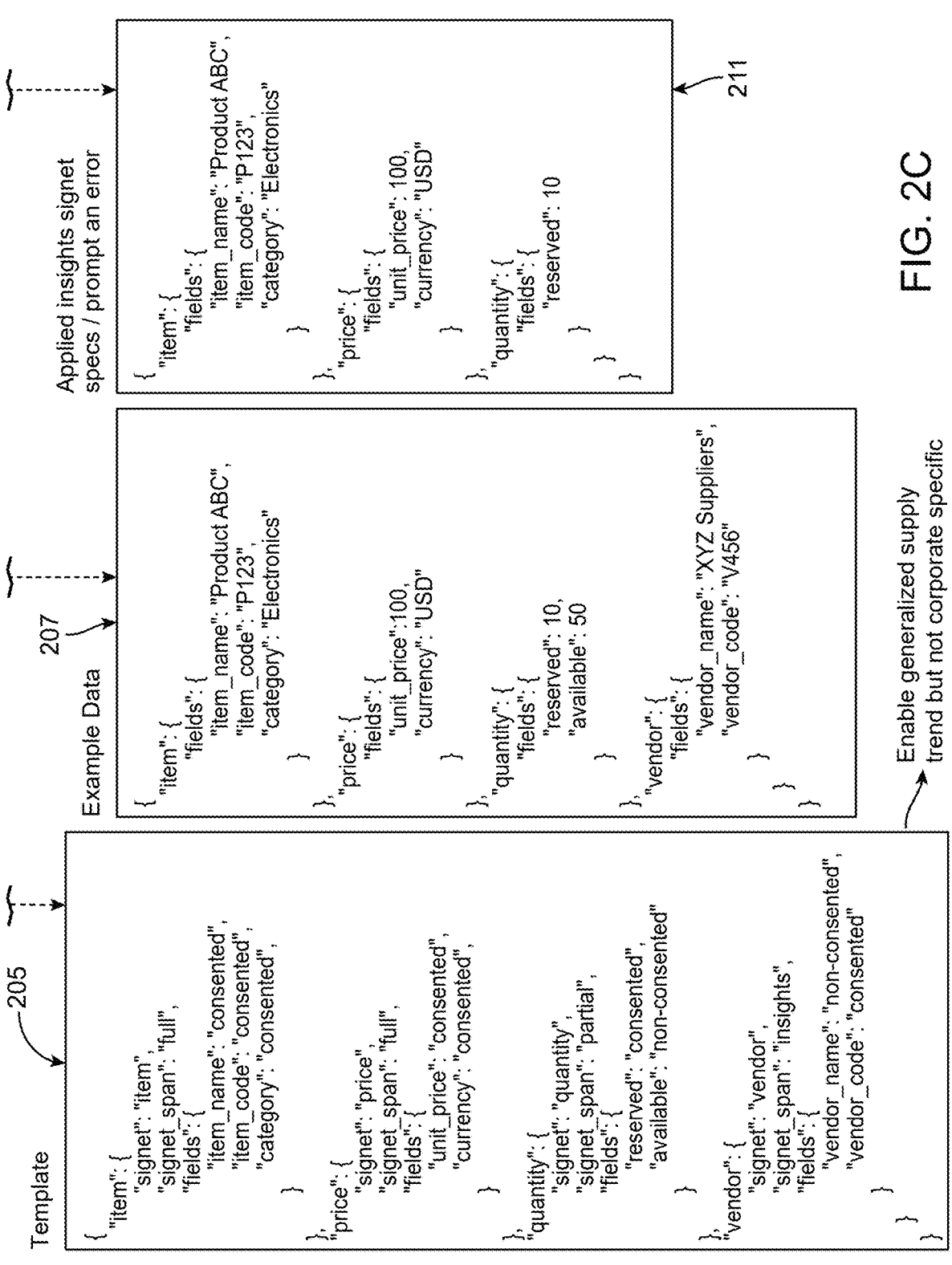

Turning to FIGS. 2B, 2C and 2D (collectively referred to as FIGS. 2B-2D), a data governance system 200 is illustrated according to a non-limiting embodiment of the present disclosure. As described herein, the data governance system 200 operates according to data governance policies and performs transparent data governance utilizing pattern based signet control on the lifecycle of data provided by a data producer 250 (e.g., a user). According to one or more embodiments, the data governance system 200 may be implemented using one or more computer systems (e.g., computer system 152 shown in FIG. 2A) to grant or deny access to data provided by the data producer 250. In one or more embodiments, the data producer 250 may use one of the computer systems 160A-160N shown in FIG. 2A. Accordingly, the data governance system 200 allows the data producer 250 to consent to which data may be used internally for data analysis to determine various insights and/or which insights may be disclosed externally, e.g., displayed or provided to a web interface 203 for public disclosure as depicted in FIG. 2B. According to a non-limiting embodiment, the web interface 203 outputs the filtered data as final data that is delivered to an external remote server 255 that provides public access to the final data 211.

The data governance system 200 includes a data security module 225 and a data signator module 201. The data signator module 201 includes a signet template generator (STG) engine 202, a signet specification enforcement (SPE) engine 208, and a pattern based signet controller (PBSC) 210. Any one of the data security module 225, the signet template generator (STG) engine 202, the SPE engine 208, and the PBSC 210 can be implemented as an electronic hardware controller including memory that stores one or more algorithms and software instructions and a processor that executes the algorithms and software instructions, according to one or more embodiments. In other embodiments, the data signator module 201 can implement the signet template generator (STG) engine 202, the data signator module 201, the SPE engine 208, and the PBSC 210 as a single hardware controller with memory.

The data security module 225 receives data provided by the data producer 250 and data governance policy information provided by a data officer 252. The data security module 225 is configured to determine an authenticity of the data producer 250 based on data producer credentials and/or verify any changes to the data governance policies using one or more authentication schemes such as, for example, multi-function authentication (MFA). According to a non-limiting embodiment, the data security module 225 identifies an anomaly associated with the signet-based governance and/or data governance policies and provides a workflow to challenge or verify the anomaly. As described in greater detail below, an anomaly includes a scenario when at least one of the consent level does not match a previously designated consent level and/or the consent identifier does not match a previously designated consent identifier. When the verification fails, the data security module 225 can generate an alert that allows the data officer 252 to take security measures, including requesting the data producer to confirm the anomaly. In one or more embodiments, the alert may be generated graphically, audibly, holographically, etc., (e.g., using the computer system 152 shown in FIG. 2A).

The data signator module 201 is in signal communication with the data security module 225 to receive raw data from the data producer 250. The data signator module 201 is configured to apply signet specifications to the raw data and to store historical data indicative of the applied signet specifications corresponding to the received data for future reference. The signet specifications are used to generate one or more signet templates 205 (see FIG. 2C). The signet templates 205 define the data governance policies (e.g., the organization, entity, etc.) and/or governance policies specified by the data producer 250. The signet specifications in this example include, but are not limited to, "item", "price", "quantity", and "vendor".

Each signet includes one or more data fields that are filled using the data provided by the data producer. In this example, the data fields of a signet may include, but are not limited to, "unit price", "currency", "reserved", "available", "vendor name", and "vendor code". Each of the data fields is assigned either a "consent" identifier or a "non-consent" identifier selected by the data producer 250 (e.g., controlled by one of the computer systems 160A-160N). Each signet included in a signet template 205 is assigned a (data) consent level such as, for example, full consent, partial consent, and insight consent. The full consent level allows for disclosing all of the data fields of the signet for both internal data analysis and external data analysis (e.g., prior to displaying insights by the web interface 203). The partial consent level allows for disclosing less than all of the data fields of the signet and/or prevents disclosing a specific value associated with a given data field. The insight consent level allows for disclosing consented fields for secure internal data analysis, while blocking disclosure of those insights from external disclosure to the public, e.g., externally for display and/or publication via the web interface 203 and/or the external remote server 255. Once generated, the signet template 205 can be used to perform one or more future data analysis tasks.

With continued reference to FIG. 2B, the STG engine 202 fills the data fields of the signets in a given signet template 205 using data obtained from a data producer to generate a governed data to produce a completed signet template 207 (see FIG. 2C). The signets, however, are still governed by their assigned consent level and the data fields are still governed by their consent identifier, and thus can serve as "governed data". The completed signet template 207 including the governed data is then passed to the SPE engine 208, which analyzes the consent levels of the individual signets and the consent identifiers of the data fields of each signet.

As shown in FIG. 2D, the SPE engine 208 outputs first filtered data 209 based on its analysis of the consent levels of the individual signets and the consent identifiers of the data fields of each signet first filtered data. Accordingly, the first filtered data 209 includes all of the signets from the completed signet template 207. However, data associated with a data field that is designated in the signet template 205 as a (positive) "consent" identifier is included in the first filtered data 209 while data associated with a data field designated as a "non-consent" identifier is excluded. In one or more embodiments, data associated with a data field assigned a value of "1" is included while data associated with a data field assigned a value of "0" is excluded. Accordingly, all of the signets from the signet template 205 and maintained in the filtered data 209 can be utilized as insights and analyzed internally, in a controlled/secure environment.

Referring again to FIG. 2B, the first filtered data 209 is passed to the PBSC 210, where it is further filtered to produce second filtered data 211. The second filtered data 211 is generated based on the consent level assigned to the signets. For example, the PBSC 210 is configured to remove any signets from the second filtered data 211 that are assigned an insight consent level (see FIG. 2C). The PBSC 210 then outputs the second filtered data 211 as final data, as shown in FIG. 2B. According to a non-limiting embodiment, the final data (e.g., the second filtered data 211) is output to a non-controlled and/or non-secure external environment such as a public server and/or web interface, for example, which requires limited access excluding any signets assigned an insight consent level and any data indicated as "non-consented." In one or more embodiments, the external remote server 255 may be representative of a public server and/or provide the web interface 203 for granting access to the final data 211. Accordingly, the data governance system 200 allows a data producer 250 to comprehend the data governance policies and data processing performed by a data governance entity and assign appropriate signets for data governance by the entity. As technical effects and solutions, the data governance system 200 provides a security system that protects data of the data producer 250 from unintended or undesired disclosure to the public based on the consent level of a signet and the content identifier of the data fields in that signet. As data producers 250 input data during various computer interactions, the data governance system 200 provides a mechanism allowing the data producer 250 to selectively protect personal or sensitive data over the lifecycle of the data, while allowing non-personal or non-sensitive data to be publicly disclosed (e.g., by a public server or the web interface 203).

Figure 3:
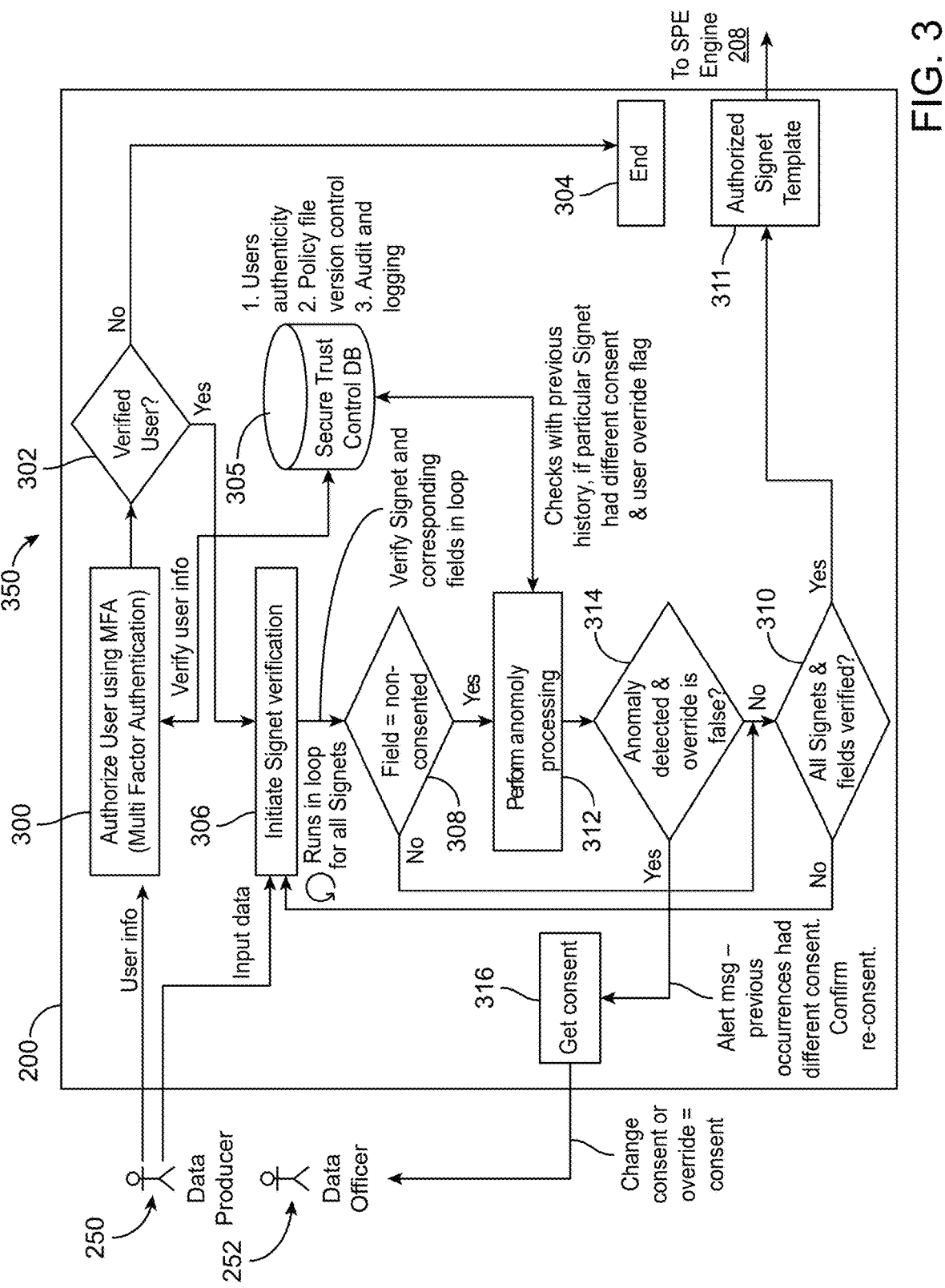
FIG. 3 depicts a data security and user verification method according to one or more embodiments of the present disclosure.

Turning now to FIG. 3, a data security and user verification method 350 is illustrated according to a non-limiting embodiment of the present disclosure. In one or more embodiments, the data security and user verification method 350 may be implemented on one or more computer systems (e.g., computer system 152 shown in FIG. 2A) using software (e.g., software 154 shown in FIG. 2A). According to one or more embodiments, the software 154 can include, be integrated with, and/or call various software modules to execute the data security and user verification method 350. The method 350 is capable of determining the authenticity of a data producer 250 and/or verifying any changes to data governance policies (e.g., implemented by an organization and/or monitored by a data officer 252). At operation 300, a data producer 250 is authorized by applying one or more authentication schemes (e.g., multi-function authentication) to input data producer credentials. According to a non-limiting embodiment, the authorization includes comparing the credentials provided by the data producer 250 with authenticated credential data (e.g., authenticated data producers/users, governance policy file versions, audit and logging data, etc.) stored in a security database 305 for verification at operation 302. When the data producer 250 is not verified, the method 350 ends at operation 304. Although not illustrated, an alert indicating a false verification can be generated before ending at operation 304.

When the data producer 250 is verified at operation 302, the method 350 proceeds to operation 306 to obtain data from the data producer 250 and a data officer 252 (or from an entity database) and initiate a verification signet process for verifying a signet associated with the data producer 250. Accordingly, the method 350 proceeds to operation 308 to determine whether every data field included in a signet of a signet template 205 is "non-consented". When the determination is "NO", the signet is authorized at operation 308, and the method 350 proceeds to operation 310 to determine whether all signets included in the signet template 205 have been verified. When all the signets have not been verified (e.g., "NO"), the method 350 returns to operation 306 to verify a remaining signet included the signet template 205. Accordingly, the signet verification processes effectively runs in a "loop" until all signets in the signet template 205 have been analyzed. When, however, all signets have been verified (e.g., "YES"), the method 350 proceeds to operation 311 which determines that the signet template is authorized and delivers the authorized signet template 205 to the SPE engine 208 for processing (e.g., data filtering) as described herein.

When, however, the signet is determined to be non-consented (e.g., "YES"), an anomaly processing is initiated at operation 312, and the method 350 proceeds to operation 314 to determine both the presence of an anomaly and the presence of anomaly override. According to a non-limiting embodiment, the anomaly processing includes comparing the current field status of the data field with historical data stored in the security database 305 to determine whether a particular data field has a different identifier than indicated by historical data. For example, when a current field status of the data field is indicated as "non-consented" but histori-cal data indicates the data field was previously indicated as "(positively) consented", then an anomaly is detected. In one or more non-limiting embodiments, one or more of the data fields may be associated with an override flag that can be selected to override the consent identifier of the current field status of the data field and use the past consent identifier in the historical data. In one or more embodiments, the data fields have options for override flags that can be selected in advance by the data producer 250. The override flag may be stored in the signet so as to be associated with its data field. When no anomaly is detected and no override is requested, the signet is verified and the method 350 proceeds to operation 310. Otherwise, a request for consent confirmation is performed at operation 316. The request for consent confirmation can include, for example, generating an alert and requesting a data officer 252 to investigate the anomaly and/or the requested override. In a non-limiting embodi-ment, the consent confirmation includes instructing the data officer 252 to request that the data producer 250 confirm the current state of the consent identifier or proceed to override the current state of the consent identifier.

Figure 4A:
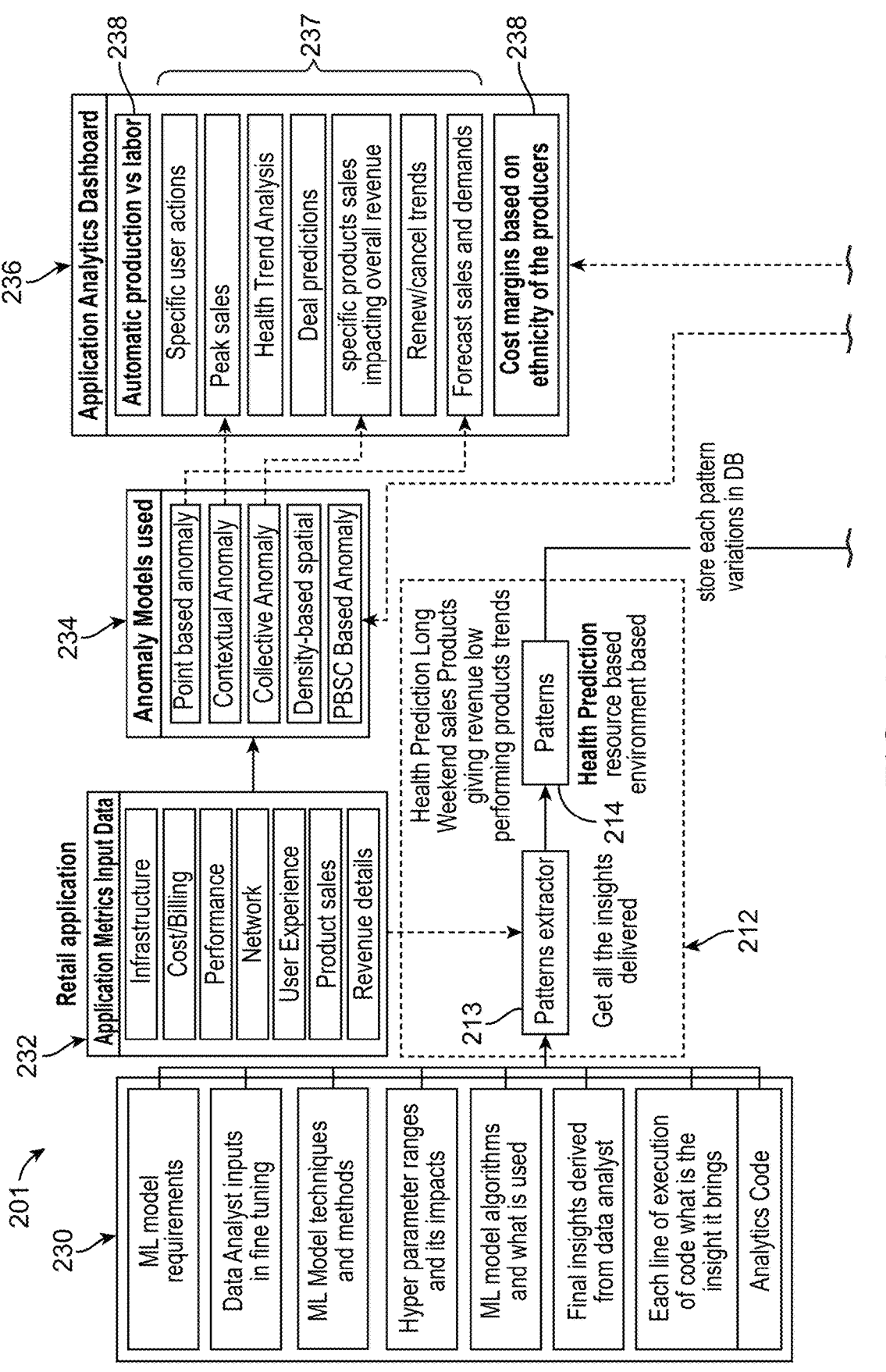
FIGS. 4A and 4B depict a data signator module according to one or more embodiments of the present disclosure.
Figure 4B:
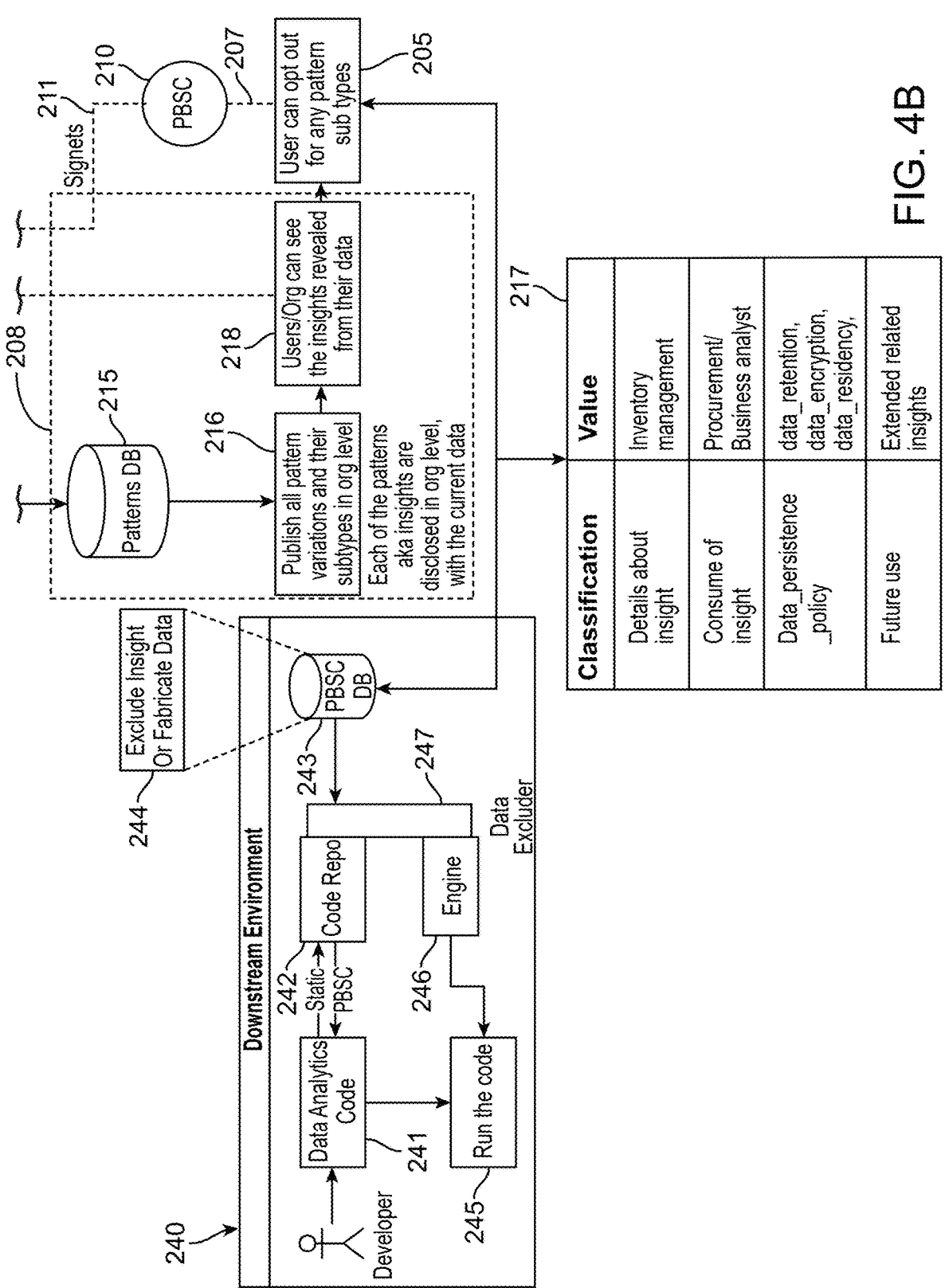

Referring collectively to FIGS. 4A and 4B, the data signator module 201 is illustrated according to a non-limiting embodiment of the present disclosure. As described herein, the data signator module 201 includes a STG engine 202, a SPE engine 208, and a PBSC 210. According to a non-limiting embodiment, the STG engine 202 receives extraction input information 230 that is used to generate a signet template 205. The STG engine 202 is configured to input information into the signet template 205 to produce a completed signet template 207 (see FIG. 2C). The extraction input information 230, includes, but is not limited to, learn-ing (ML) requirements, data analysis ML fine tuning param-eters, ML modeling techniques and methods, hyper param-eter ranges, hyper parameter impacts, ML model algorithms, final insights derived from data analyst results, and insight analytics code. The ML requirements include, but are not limited to, demand forecasting, passive forecasting, active forecasting, short-term demand, long-term demand, micro level demand, and macro level demand. The data analysis ML fine tuning parameters include, but are not limited to, timelines, product categories, forecasting factors, qualitive parameters, quantitative parameters, historical data, inven-tory balance, macro trends, environmental factors, financial metrics, and informed scaling. The ML modeling techniques and methods include, but are not limited to, exponential modeling methods, moving average techniques, double experimental modeling methods, Holt-Winters techniques, Delphi modeling methods, autoregression integration, neu-ral networks, and econometric modeling techniques. The hyper parameter ranges and impacts include, but are not limited to, instant demands at period, average demands per period, time between positive demands, forecast of demand intervals, smooth constants, and interval between last posi-tive demands. The ML model algorithms include, but are not limited to, exponential smoothing models, Croston method, bootstrapping, and Syntetos-Boylan approximation. The insights derived or utilized include, but are not limited to, cost insights, user actions, store specific revenue forecasts, long weekend peak sales, product-based demands, and inventory forecasts.

The pattern generator 212 also receives raw data 232 from a data producer. The raw data 232 includes application metric data pertaining to the data producer. The raw data 232 can include, but is not limited to, infrastructure data, cost and/or billing data, organization performance data, network data, user experience data, product sales data, and revenue data.

The STG engine 202 includes a pattern extractor 213 that is configured to generate predictions and trending patterns. Although the pattern extractor 213 is shown being external from the SPE engine 208, it should be appreciated that the pattern extractor 213 can be implemented in the SPE engine 208 and driven by a controller operating therein, in one or more embodiments. According to a non-limiting embodi-ment, the pattern extractor 213 receives the extraction input information 230 and raw data 232, extracts all the insights from the raw data 232 using the extraction input information 230, and generates one or more insight patterns 214 based on the extracted insights. The insight patterns 214 are then used by the STG engine 202 to generate a signet template 205.

The SPE engine 208 includes a pattern database 215 and a data publisher 216. The SPE engine 208 stores the insight patterns 214 received from the pattern generator 212 in the pattern database 215. The data publisher 216 obtains the insight patterns 214 from pattern database 215 and publishes all variations of the insight patterns 214 and insight pattern sub-types in an organized list 217 that is made available to the data producer. According to a non-limiting embodiment, each insight pattern 214 is disclosed according to an orga-nized level and is indexed with respect to the raw data 232. In addition, the published insight patterns 214 can include a list of one or more anomaly models 234, which are made available to the data producer. In this manner, data producers can be made aware of the insight patterns 214 that were generated using their raw data 232. By knowing the specific raw data 232 that is being used to generate the insight patterns 214, a signet template 205 can be generated that allows a data producer to assign a consent level (e.g., full consent, partial consent, insight consent) for a given signet and to specify a consent identifier (e.g., (positively) con-sented or non-consented) for one or more data fields included in a given signet.

Once generated, the signet template 205 associated with the data producer can then be stored in a PBSC database 243 and used by the PBSC 210 to perform subsequent data filtering on completed signet templates 207 filled with data provided by the data producer. According to a non-limiting embodiment, the PBSC database 243 is located in a down-stream environment 240, along with a data analytics code 241, code repository 242, a code emulator 245, a software engine 246, and a data excluder 247. A developer generates the data analytics code 241, which is stored in the code repository 242 and is used by an organization to process extensive datasets and raw data provided by a data producer.

The data excluder 247 ensures that specific patterns or insights are restricted from use with the data analytics code 241 based on the (positive) consents or non-consents des-ignated by a data producer. These restrictions are applied either to the data analytics code 241 stored in the code repository 242, and/or at the time of building and deploying the software engine 246 capable of running the data analyt-ics code 241. In either case, the downstream environment 240 executes the data analytics code 241, e.g., using a code emulator 245, with the restricted patterns or insights in place, thereby ensuring compliance with consent requirements designated by the data producer.

As described herein, the PBSC 210 receives the completed signet templates 207, and performs data filtering to generate final output data 211 (see FIG. 2C). The final output data 211 can be provided to an analytics dashboard 236 (e.g., operated by an external public server such as, for example, the external remote server 255), which displays the filtered insight pattern information according to the consent levels and consent identifiers specified by the data producer. This provides a security system that effectively grants access to selected pieces of data as designated by the data producer while denying access to other pieces of data (e.g., personal or sensitive data) as designated by the data producer. For example, the analytics dashboard 236 displays (positively) consented insight pattern information 237 (e.g., specific user actions, peak sales, health trend analysis, deal predictions, specific product sales impacting overall revenue, renewal/ cancellation trends, and sales/demands forecasts), while excluding non-consented insight pattern information 238 (e.g., automatic production versus labor data, and cost margins based on personal demographics of the data producers).

Figure 5:
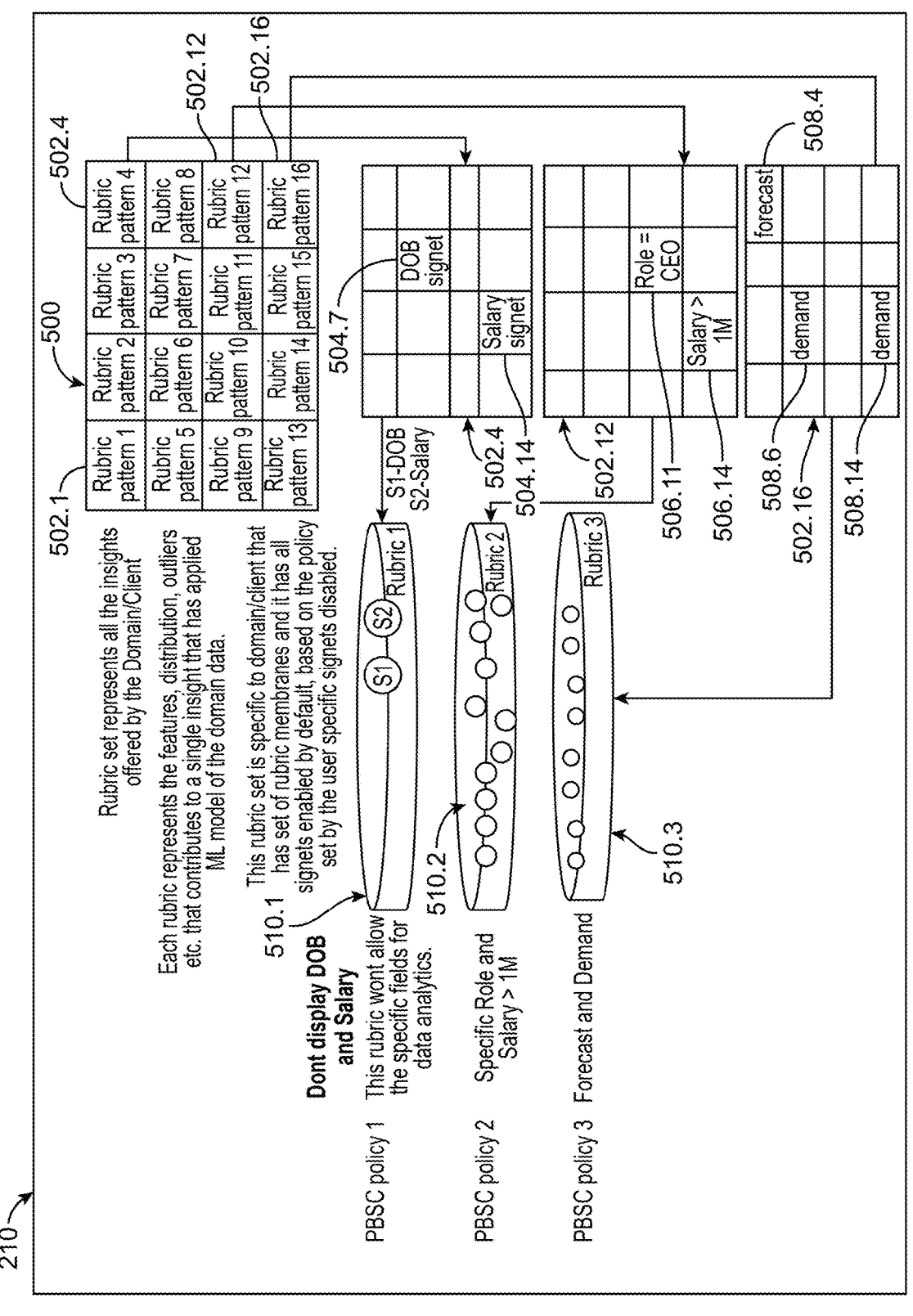
FIG. 5 is a diagram depicting PBSC policy and rubric patterns utilized by the data governance system according to one or more embodiments of the present disclosure.

Turning to FIG. 5, a diagram depicting PBSC policy and rubric patterns utilized by the data governance system 200 is illustrated according to a non-limiting embodiment. For example, the PBSC 210 can store and utilize rubric patterns 510.1, 510.2 and 510.3 (collectively referred to as rubric patterns 510.1-510.3) that define PBSC policies, which determine how a particular signet data governance process is applied based on the consumption trend of associated insights. Although three rubric patterns 510.1-510.3 are shown, it should be appreciated that more or less rubric patterns can be implemented without departing from the scope of the invention.

The rubric patterns 510.1-510.3 can be generated using a rubric matrix 500 including an array of individual rubrics 502.1-502.16. The rubric matrix 500 represents all the available insights offered by a data producer. Although the rubric matrix 500 is shown as having a 4-by-4 (4×4) array totaling sixteen (16) rubrics, it should be appreciated that more or less rubrics can be included in the matrix 500 without departing from the scope of the invention. Each rubric 502.1-502.16 represents the features, distributions, outliers, signets, etc., that contribute to a single insight that is associated with the raw data and identified insight patterns (e.g., obtained via ML pattern-based extraction provided by the data producer.

For example, rubric 502.4 includes a date of birth (DOB) signet 504.7 and a salary signet 504.14, rubric 502.12 includes an employee role (e.g., CEO) signet 506.11 and a salary threshold (e.g., greater than $1 M) signet 506.14, and rubric 502.16 includes forecast signet 508.4, a first demand signet 508.6, and a second demand signet 508.14. Accordingly, the date of birth (DOB) signet 504.7 and salary signet 504.14 are used to establish a DOB and salary exclusion rubric pattern 510.1, which controls the PBSC 210 to filter out and exclude DOB and salary information from the raw data provided by the data producer. The employee role signet 506.11 and the salary threshold signet 506.14 are used to establish an employee role and salary rubric pattern 510.2, which controls the PBSC 210 to display the salaries of CEOs having a salary of greater than $1 M from the raw data provided by the data producer. The forecast signet 508.4, first demand signet 508.6, and second demand signet 508.14 are used to establish a forecast and demand rubric pattern 510.3, which controls the PBSC 210 to display forecast and demand trends based on the raw data provided by the data producer. Based on the rubric patterns 510.1-510.3, the PBSC 210 can determine which data to provide or exclude, e.g., which data to display or exclude (e.g., from the analytics dashboard 236 shown in FIG. 4A).

As described herein, various non-limiting embodiments provide a data governance system that achieves transparent data lifecycle governance and supervision using a data governance PBSC. The PBSC facilitates a dynamic technical scheme for managing data governance by using patterns or signatures, along with machine learning to control and supervise data access and usage throughout its lifecycle. The PBSC also performs pattern identification in data interactions, which is then used to authorize or restrict data operations, making governance more adaptable and context aware. PBSC can also continuously monitor data usage and adjust permissions in real-time, ensuring compliance with organizational policies and regulatory requirements. By employing pattern recognition and machine learning, the PBSC can automatically refine its governance controls as data behavior evolves. Accordingly, the data governance system ensures both transparency and security in data management, while reducing the need for manual interventions in the governance process It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
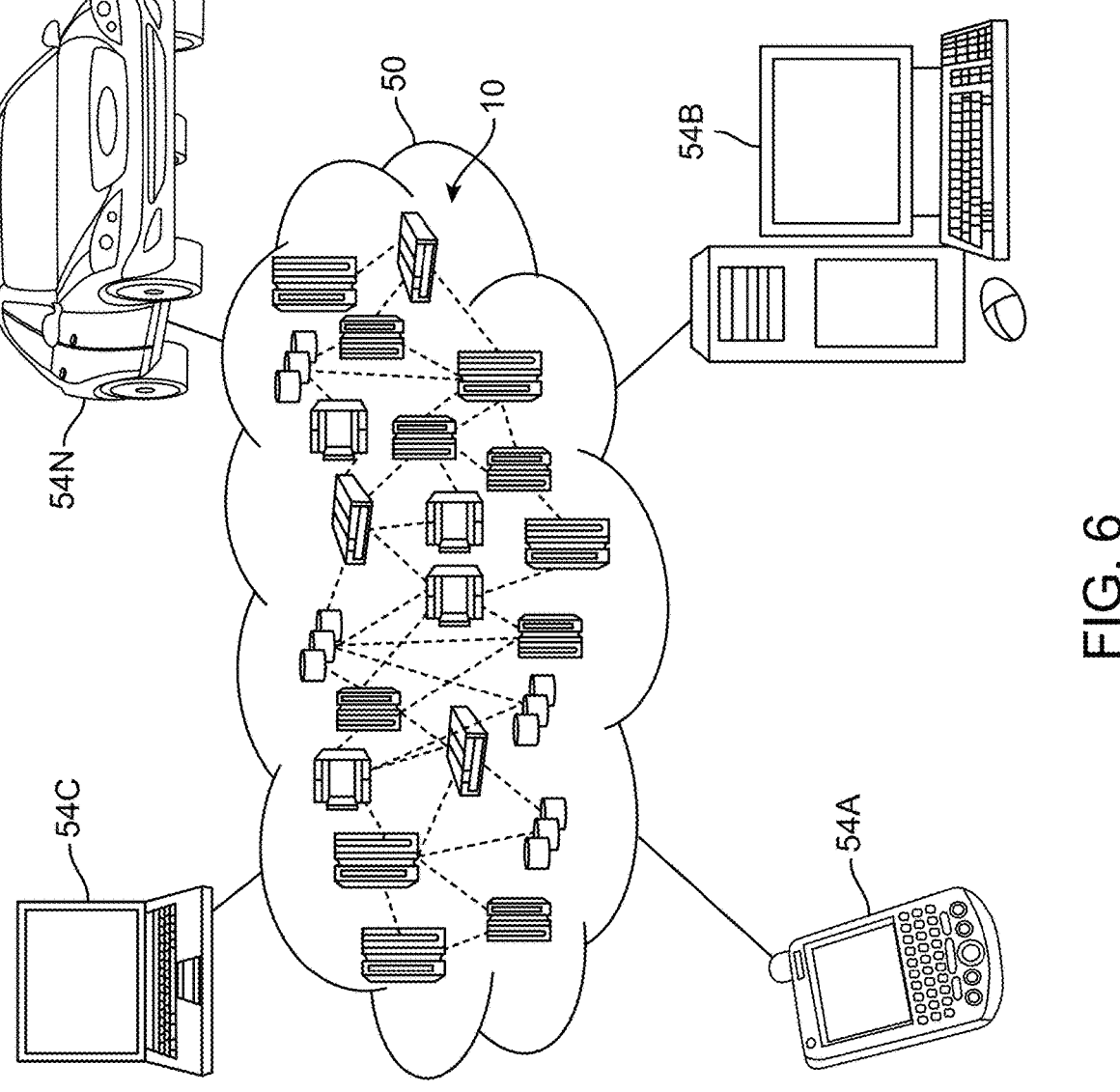
FIG. 6 depicts a cloud computing environment in accordance with one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
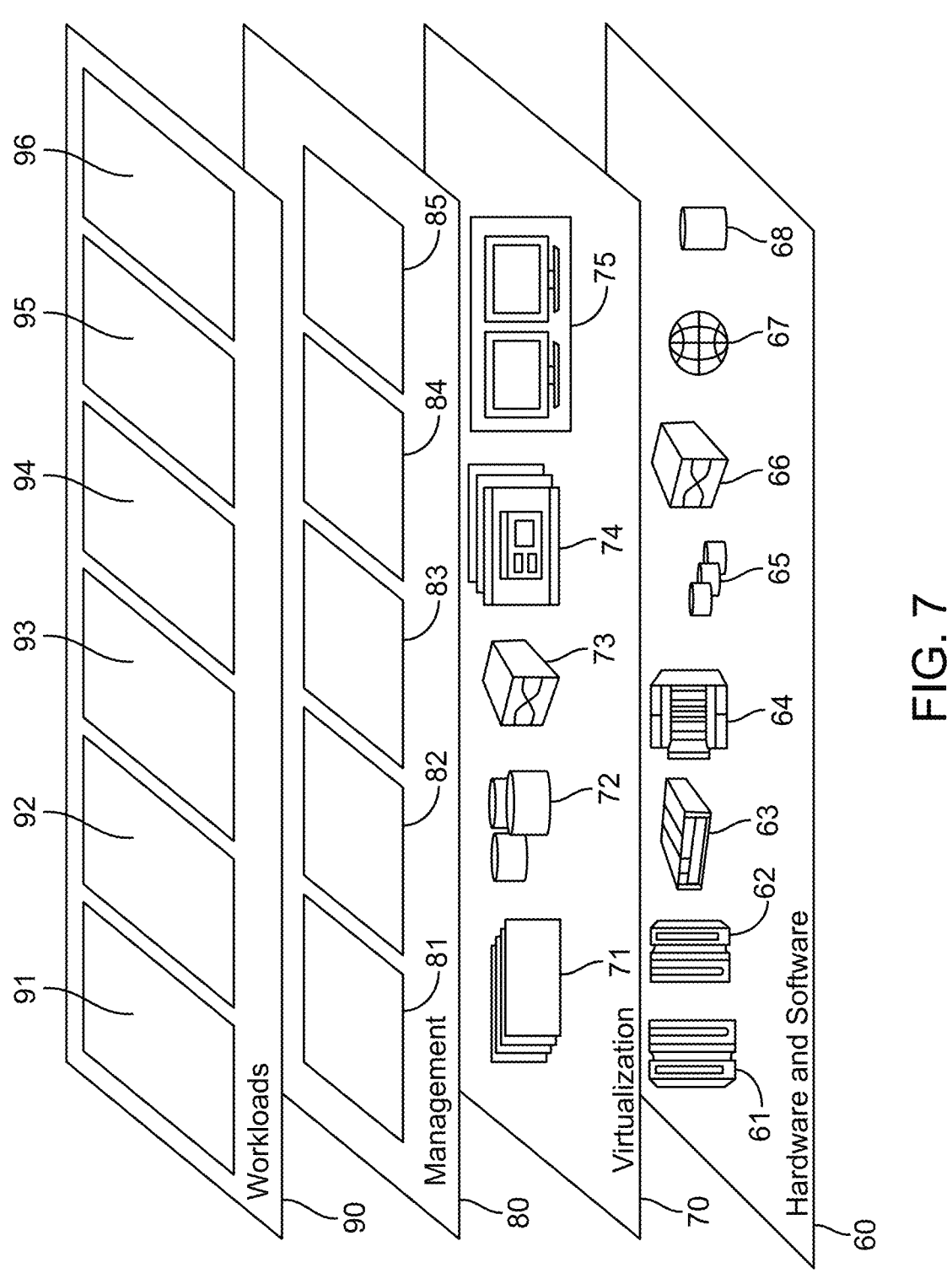
FIG. 7 depicts abstraction model layers in accordance with one or more embodiments of the present invention.

Referring now to FIG. 7, a set of functional abstraction layers provided by cloud computing environment 50 (depicted in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 can execute a system 200 that performs data governance utilizing pattern based signet control to achieve transparent data lifecycle.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagrams, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A data governance system comprising:

a memory having computer readable instructions; and a processor for executing the computer readable instructions, the computer readable instructions when executed cause the processor to perform operations comprising:

controlling a signet template generator (STG) engine configured to generate a signet template by applying at least one signet to raw data received from a data producer, the at least one signet being designated with a consent level and including at least one data field designated with a consent identifier;

controlling a signet specification enforcement (SPE) engine in signal communication with the STG engine to receive the signet template, wherein the SPE engine is configured to analyze the consent level of the at least one signet and the consent identifier of the at least one data field, and wherein the SPE engine is configured to output first filtered data based on the consent identifier of the at least one data field;

controlling a pattern based signet controller (PBSC) in signal communication with the SPE engine, wherein the PBSC is configured to generate second filtered data based on the consent level of the at least one signet, and wherein the PBSC is configured to output a combination of the first filtered data and the second filtered data as final data to an external remote server for external access; and controlling a data security module configured to obtain historical data associated with the at least one signet and configured to perform a signet verification process based on the historical data, wherein the signet verification process includes detecting an anomaly with the at least one signet in response to determining at least one of the consent level does not match the previously designated consent level and the consent identifier does not match the previously designated consent identifier.

2. The data governance system of claim 1, wherein the first filtered data restricts output of the at least one data field to the PBSC based on the consent identifier.

3. The data governance system of claim 2, wherein the second filtered data restricts output of the at least one signet to the external remote server based on the consent level.

4. The data governance system of claim 1, wherein the historical data indicates a previously designated consent level of the at least one signet and a previously designated consent identifier of the at least one data field.

5. The data governance system of claim 1, wherein the PBSC is configured to store at least one rubric pattern associated with at least one insight used to generate the at least one signet applied to the raw data and exclude the at least one insight from the final data based on the at least one rubric pattern.

6. A computer-implemented method comprising:

receiving raw data from a data producer;

generating, by a signet template generator (STG) engine, a signet template by applying at least one signet to the raw data, the at least one signet being designated with a consent level and including at least one data field designated with a consent identifier;

analyzing, by a signet specification enforcement (SPE) engine, the consent level of the at least one signet and the consent identifier of the at least one data field;

outputting, by the SPE engine, first filtered data based on the consent identifier of the at least one data field;

generating, by a pattern based signet controller (PBSC), second filtered data based on the consent level of the at least one signet;

providing historical data associated with the at least one signet to a data security module;

performing, by the data security module, a signet verification process based on the historical data that indicates a previously designated consent level of the at least one signet and a previously designated consent identifier of the at least one data field, wherein the signet verification process comprises detecting an anomaly with the at least one signet in response to determining at least one of the consent level does not match the previously designated consent level and the consent identifier does not match the previously designated consent identifier; and outputting, by the PBSC, a combination of the first filtered data and the second filtered data as final data to an external remote server for external access.

7. The computer-implemented method of claim 6, further comprising filtering the first filtered data by restricting output of the at least one data field to the PBSC based on the consent identifier.

8. The computer-implemented method of claim 7, further comprising filtering the second filtered data by restricting output of the at least one signet to the external remote server based on the consent level.

9. The computer-implemented method of claim 6, further comprising:

storing in the PBSC at least one rubric pattern associated with at least one insight used to generate the at least one signet applied to the raw data; and excluding the at least one insight from the final data based on the at least one rubric pattern.

10. A computer program product to control a computing system to perform data governance, the computer program product comprising a computer readable storage medium having program instructions embodied therewith, the program instructions executable by an electronic computer processor to control the computing system to perform operations comprising:

receiving raw data from a data producer;

generating, by a signet template generator (STG) engine, a signet template by applying at least one signet to the raw data, the at least one signet being designated with a consent level and including at least one data field designated with a consent identifier;

analyzing, by a signet specification enforcement (SPE) engine, the consent level of the at least one signet and the consent identifier of the at least one data field;

outputting, by the SPE engine, first filtered data based on the consent identifier of the at least one data field;

generating, by a pattern based signet controller (PBSC), second filtered data based on the consent level of the at least one signet;

providing historical data associated with the at least one signet to a data security module;

performing, by the data security module, a signet verification process based on the historical data that indicates a previously designated consent level of the at least one signet and a previously designated consent identifier of the at least one data field, wherein the signet verification process comprises detecting an anomaly with the at least one signet in response to determining at least one of the consent level does not match the previously designated consent level and the consent identifier does not match the previously designated consent identifier; and outputting, by the PBSC, a combination of the first filtered data and the second filtered data as final data to an external remote server for external access.

11. The computer program product of claim 10, further comprising filtering the first filtered data by restricting output of the at least one data field to the PBSC based on the consent identifier.

12. The computer program product of claim 11, further comprising filtering the second filtered data by restricting output of the at least one signet to the external remote server based on the consent level.

13. The computer program product of claim 10, wherein the signet verification process comprises:

generating, by the data security module, an alert in response to detecting the anomaly.

* * * * *